United States Patent [19]
Schulz et al.

[11] Patent Number: 5,887,390
[45] Date of Patent: Mar. 30, 1999

[54] BOOM SWING CONTROL DEVICE AND ASSEMBLY

[75] Inventors: Joey W. Schulz, Apple Valley; Chad L. Moe, Hopkins, both of Minn.

[73] Assignee: Ag-Chem Equipment, Co., Inc., Minnetonka, Minn.

[21] Appl. No.: 756,658

[22] Filed: Nov. 26, 1996

[51] Int. Cl.$^6$ .................... B05B 3/00; B05B 1/20
[52] U.S. Cl. ................ 52/114; 52/115; 212/245; 212/250; 212/272; 239/167; 239/172
[58] Field of Search .............. 52/114, 115; 212/245, 212/250, 272, 297, 349; 239/156, 166, 167, 168, 172

[56] References Cited

U.S. PATENT DOCUMENTS

| | | |
|---|---|---|
| 2,850,836 | 9/1958 | Copeland . |
| 3,395,503 | 8/1968 | Greenburg et al. . |
| 3,657,969 | 4/1972 | Wirkus . |
| 3,807,676 | 4/1974 | Bieker et al. . |
| 3,815,760 | 6/1974 | Nephew . |
| 3,887,132 | 6/1975 | Widmer . |
| 3,972,476 | 8/1976 | Hall . |
| 4,288,034 | 9/1981 | Widmer et al. . |
| 4,344,572 | 8/1982 | Tyler . |
| 4,372,492 | 2/1983 | Blumenshine . |
| 4,394,968 | 7/1983 | Tyler . |
| 4,854,503 | 8/1989 | Little et al. . |
| 5,018,631 | 5/1991 | Reimer . |
| 5,222,614 | 6/1993 | Ballu . |
| 5,507,435 | 4/1996 | Benest . |
| 5,630,547 | 5/1997 | Klemenhagen et al. . |

*Primary Examiner*—Robert Canfield
*Attorney, Agent, or Firm*—Larkin, Hoffman, Daly & Lindgren, Ltd.

[57] ABSTRACT

A boom swing control device for controlling boom swing relative to a frame. Booms may be supported relative to a frame for application of material over a wide area. During an application process, the booms are subjected to various external forces which cause the booms to move or swing relative to the frame. The boom swing control device of the present invention includes first and second members operably coupled to the boom and the frame supporting the boom to control and dampen movement of the boom relative to the frame. The second member is moveably supported relative to the first member to move between an extended or excited position and a retracted normal operation position. Operation of the relative movement of the second member relative to the first member is controlled via a control assembly designed to allow the second member to move relative to the first member to an excited position upon application of a predetermined force and designed to normally bias the second member relative to the first member in a normal operation position for continued operation.

18 Claims, 10 Drawing Sheets

BOOM SWING CONTROL DEVICE AND ASSEMBLY

The present invention relates to an assembly for securing a boom relative to a frame for operation. In particular, the present invention relates to an assembly for supporting a boom which may be coupled to a self-propelled vehicle for spreading material over a wide area for agricultural and other applications.

A boom is used to support an application system for spreading material over a wide area. The boom is supported via a boom chassis assembly which may be coupled to a self-propelled vehicle via a frame. The vehicle includes a supply of material to be spread. The application system includes a transport conduit which is supported by the boom. Material provided to the transport conduit is spread at various distances from the vehicle for wide application of materials. Typical booms may be rotationally supported relative to a frame of the vehicle, to move between an opened operating position to a closed non-operating position. Typical booms are subjected to a wide variety of forces during operation due to the wide extent of the boom as well as other factors.

Typical forces are applied to the boom during vehicle acceleration, braking, turns and changes in direction. Other forces may be applied when a hill, rocks, or other obstructions are encountered. When a force is applied to the boom, it is essential that the boom be able to accommodate the force without excessive wear and tear on the boom or boom frame. Booms are designed to allow the boom to move relative to the frame in order to compensate for the various forces applied to the boom. It is important that the boom assembly be designed to allow the boom to move to compensate for various forces applied to the boom. It is also important that after such forces are released from the boom, that the boom return to its operating position without excess swing. Excess swing may be caused by the force applied to the boom by a harmonic oscillation type system designed to re-position the boom to the operating position upon release of a force. Swing continues until excess energy in the system is dampened and the boom comes to rest at the operating position.

It is desirable to provide a boom support structure which allows a boom to move upon application of an outside force so that excess stress is not applied to the boom, causing fatigue of the boom structure. However, it is important that boom swing caused by an external force be controlled and dampened without excess swing so that proper operation can be resumed.

SUMMARY OF THE INVENTION

The present invention relates to a boom swing control device for controlling boom swing caused by various forces applied to the boom. The boom swing control device of the present invention includes first and second members operably coupled to the boom and a frame supporting the boom to control and dampen movement of the boom relative to the frame. The second member is moveably supported relative to the first member to move between an extended or excited position and a retracted normal operational position. Operation of the relative movement of the second member relative to the first member is controlled via a control assembly. The control assembly includes a means for allowing the second member to move relative to the first member from a normal operation position to an excited position upon application of a predetermined force and a system for supplying a return force to the second member to position the second member in the normal operation position relative to the first member.

In a preferred embodiment of the invention, the control assembly is a fluid control system. The fluid control system is coupled to the second member and a fluid supply source to supply fluid to normally bias the second member in a normal operation position. The fluid control system also includes a fluid release system to release fluid at a predetermined pressure to allow the second member to move relative to the first member upon application of an external force to compensate for the external force. The control system continually operates to supply fluid to bias the second member towards the normal operation position relative to the first member to dampen boom swing for continued operation.

DESCRIPTION OF THE PREFERRED EMBODIMENT

Figure 1:
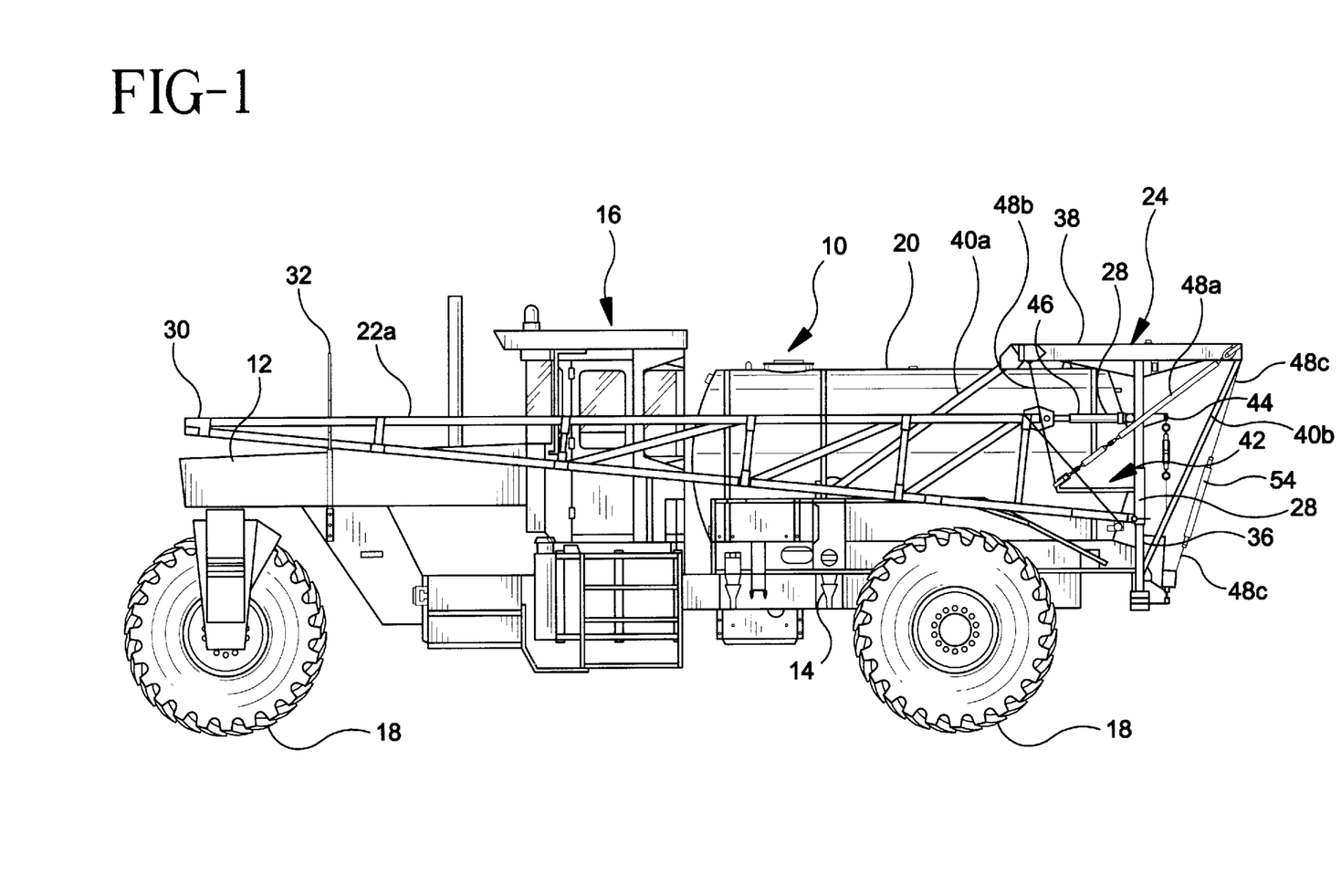
FIG. 1 is a side elevational view of a vehicle incorporating the features of the present invention.

The boom swing control device of the present invention has many applications one of which is shown in FIG. 1. FIG. 1 is a side elevational view of a vehicle 10 incorporating the boom swing control device of the present invention. The vehicle 10 includes a body 12, frame frame 14, cab 16, wheels 18, tank 20, boom 22 and boom chassis assembly 24. The frame 14 supports the body 12 and cab 16 of the vehicle 10. The frame 14 of the vehicle 10 is generally supported by the wheels 18 of the vehicle 10. Tank 20 contains material to be distributed as the vehicle 10 travels along a selected path. Material from the tank 20 is spread over a large area in cooperation with the boom 22. The boom 22 is supported relative to the frame 14 of the vehicle by the boom chassis assembly 24.

The boom chassis assembly 24 supports first and second booms 22a and 22b (not shown in FIG. 1) for selective operation in a closed position (non operational position) shown in FIG. 1 to an opened, operational position (not shown in FIG. 1). The booms are pivotally supported relative to the boom chassis assembly 24 as will be described to rotate between the closed position to the opened position as indicated by arrow 26 shown in FIG. 2. The booms 22 are formed of a rigid structural member which has a stem 28 and a tip 30. The structural member of the booms 22 extends between the stem 28 and tip 30. The extent between the stem 28 and tip 30 of booms 22a and 22b defines the potential spread area for the vehicle 10. The larger the extent between the stem 28 and tip 30 of the booms 22, the greater the spread area of a vehicle 10. In the closed position, the tip 30 of boom 22 is supported by boom rest 32.

The boom chassis assembly 24 is formed of a rigid frame and includes a support post 36, control canopy 38 and support trusses 40a–b. The support post 36 is secured relative to a rear end of the vehicle frame 14. The control canopy 38 is coupled to and supported relative to the frame 14 of the vehicle 10 via the support post 36 and the support trusses 40a–b. As shown in FIG. 1, support truss 40a extends from a front end of the control canopy 38 and support truss 40b extends from a rear portion of the control canopy 38.

The booms 22 are pivotally mounted relative to the support post 36 of the boom chassis assembly 24 to pivot between the closed position and the opened position. The booms 22 includes plate 42, mounting plate 44 and boom position adjustment cylinder 46. The boom position adjustment cylinder 46 raises and lowers tip 30 of the boom 22 to adjust the inclination angle of the boom 22 between the stem 28 and tip 30 of the boom 22. The boom position adjustment cylinder 46 includes a cylinder having a rod moveable therein. The position of the rod is adjusted within the cylinder to raise and lower the boom tip 30. The position of the rod within the cylinder is moveably controlled by a control assembly (not shown). The control assembly is coupled to operator controls for allowing the operator to selectively raise and lower the boom tip 30 as desired.

The booms 22 are moveably secured relative to the boom chassis assembly 24 via boom cables 48a–c. The boom cables 48a–b are secured to the boom relative to plate 42 and are operably coupled to the boom chassis assembly 24. Boom cable 48c includes a boom swing control device 54 for dampening external forces applied to the boom 22 and cable 48c. A boom cable 48c is secured to each boom 22a–b relative to mounting plate 44 and is operably coupled to the boom chassis assembly 24 as will be described.

Figure 2:
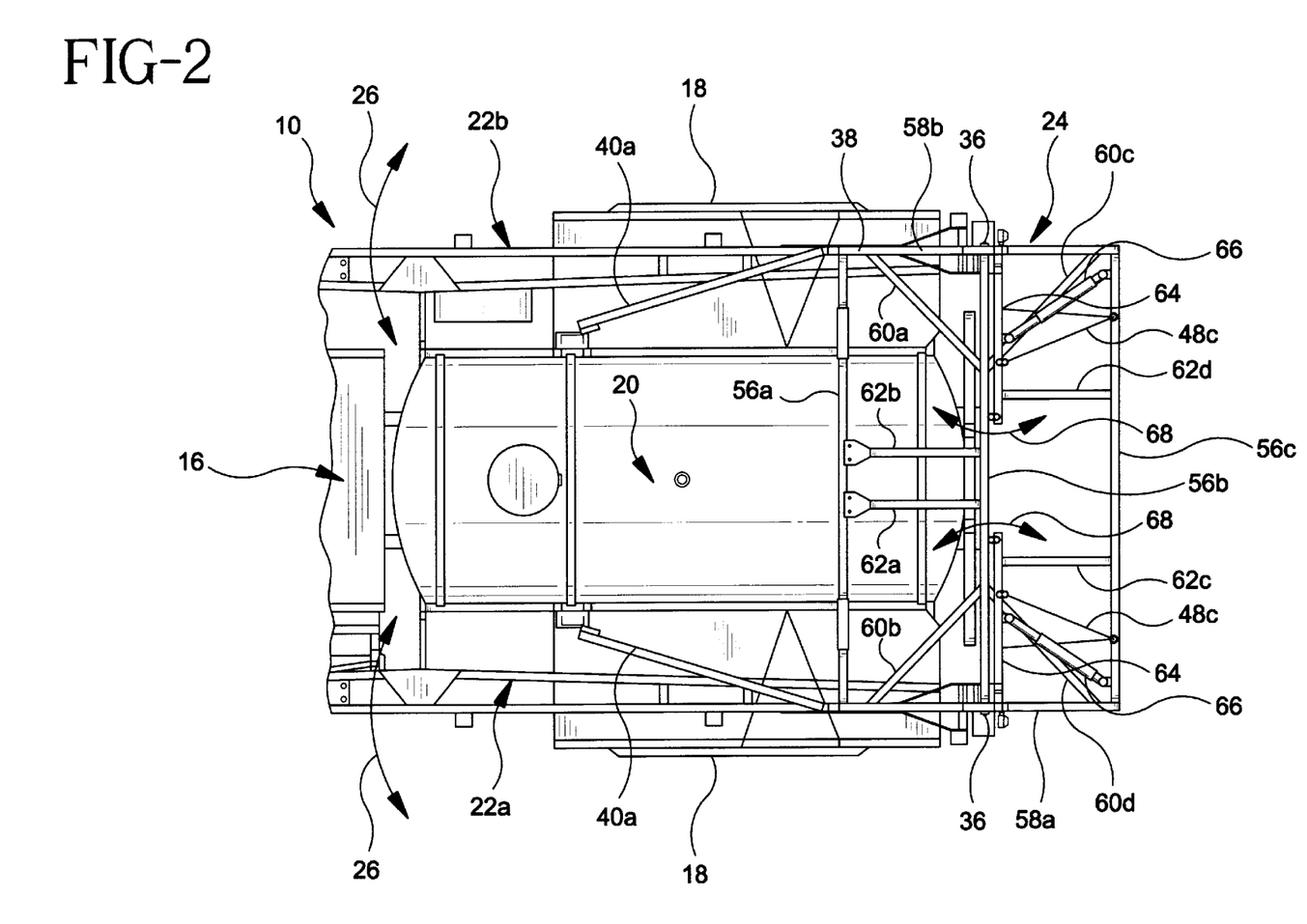
FIG. 2 is a top plan view of a portion of the vehicle of FIG. 1 illustrating the boom and boom chassis assembly.

FIG. 2 is a top plan view of the vehicle 10 of FIG. 1 shown with boom cable 48c. The control canopy 38 of the boom chassis assembly 24 is formed of a rigid frame structure including center, front and rear canopy cross beams 56a–c and opposed canopy end beams 58a–b. The opposed canopy end beams 58a–b are supported relative to the support post 36. The center, front and rear canopy cross beams 56a–c are supported between opposed canopy end beams 58a–b. Additional edge cross supports 60a–d and intermediate supports 62a–b are included to reinforce the structural integrity of the control canopy 38.

Figure 3:
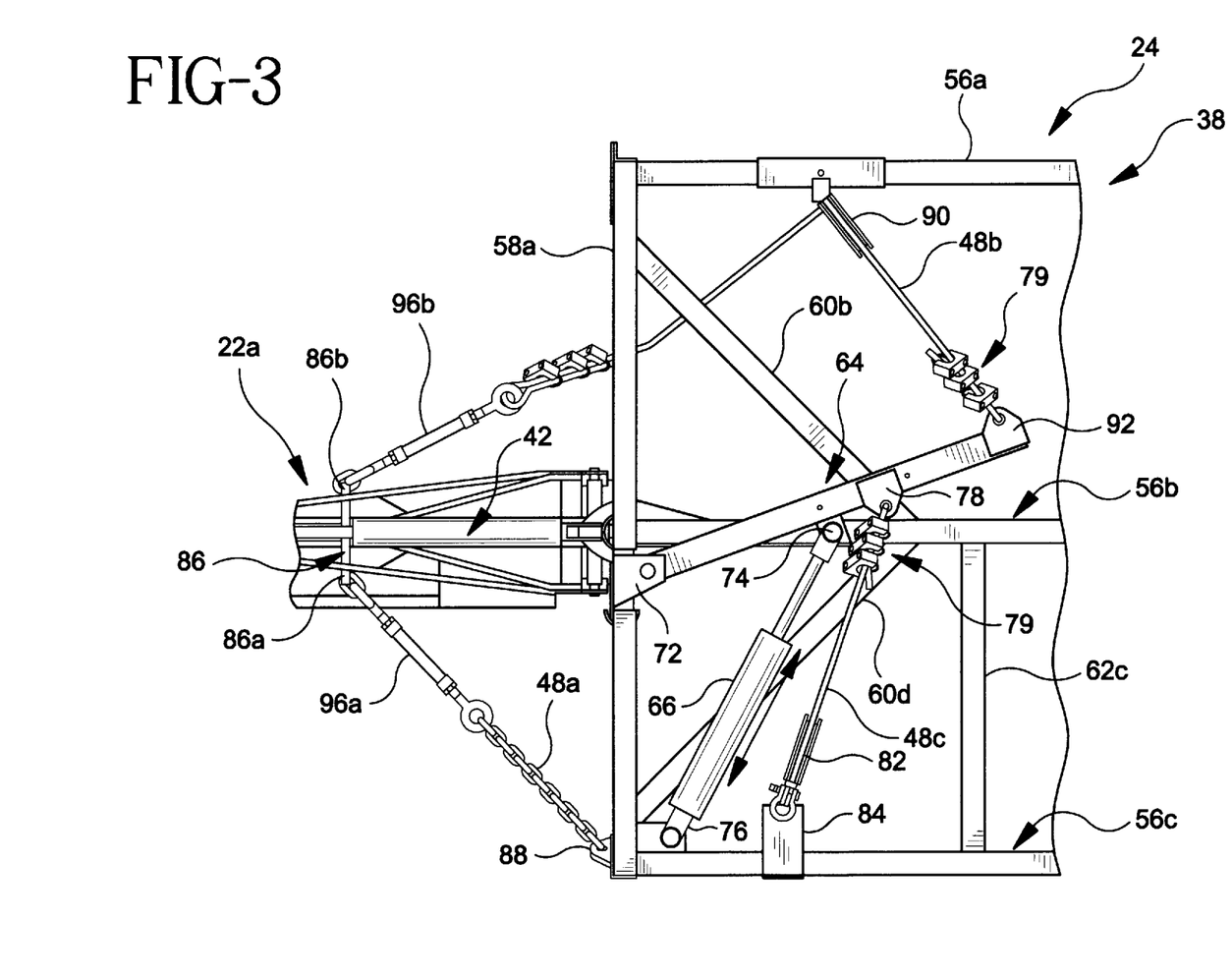
FIG. 3 is a partial top plan view similar to FIG. 2, illustrating a boom in an opened operational position.

As shown, the control canopy 38 supports a boom actuation assemblies designed for moving the boom 22 between the closed non-operational position and the opened operational position. The boom actuation assemblies include a lever arm 64 and a boom actuation cylinder 66. As shown, the lever arm 64 is pivotally mounted relative control canopy 38 to move as indicated by arrow 68. The boom actuation cylinder 66 is an adjustable length cylinder device including a cylinder having a rod moveable therein to extend and retract the overall effective length of the adjustable length cylinder device. The boom actuation cylinder 66 is coupled between the control canopy 38 and the lever arm 64 to pivot the lever arm 64. The boom actuation cylinder 66 is actuated between a retracted position and an extended position to pivot the lever arm 64 as indicated by arrow 68. This is what moves the boom 22 to the operational position from the closed non-operational position FIG. 3 is a detailed top plan view of a portion of the vehicle 10 illustrating a portion of the boom 22a and control canopy 38 of the boom chassis assembly 24 shown with the boom in the opened operational position. As shown more clearly, lever arm 64 is pivotally mounted to lever bracket 72 fixed to canopy end beam 58a. An end of the boom actuation cylinder 66 is coupled to a cylinder bracket 74 fixed to the lever arm 64 a distance from the pivotal connection for the lever arm 64 to the canopy end beam 58a. An opposed end of the boom actuation cylinder 66 is coupled to a cylinder bracket 76 fixed to the control canopy 38 to pivot the lever arm 64. The boom cable 48c supporting the boom swing control device 54 is coupled to the lever arm 64 via swing bracket 78 spaced from the pivotal connection of the lever arm 64 relative to the canopy end beam 58a. The boom cable 48c is secured to the swing bracket 78 via a plurality of clamps 79 as shown. The boom cable 48c is also moveably coupled to the boom chassis assembly 24 via pulley 82 shown in cross section. Pulley 82 is supported via pulley bracket 84.

The boom 22 is supported for operation via boom cables 48a–c. A cross support 86 is coupled to the plate 42 of the boom 22 to define a first support extension 86a and a second support extension 86b aligned perpendicular to the plate 42. Ends of cables 48a and 48b are fixedly secured relative to the first support extension 86a and the second support extension 86b. An opposed end of cable 48a is coupled to cable bracket 88 mounted on canopy end beam 58a. Cable 48b is moveably supported relative to the front canopy cross beam 56a via cable pulley 90 and an end of the cable 48b is secured via cable bracket 92 relative to the lever arm 64 at a location spaced from the pivotal connection of the lever arm 64 to the boom chassis assembly 24. Cable 48b is secured to cable bracket 92 via a plurality of clamps 79. Boom cables 48a and 48b include turn buckles 96a and 96b for adjusting the effective length or tension of the boom cables 48a and 48b.

The lever arm 64 pivots between a boom extended position (shown in FIG. 3, not completely extended) to a boom retracted position (shown in FIG. 2) to control the boom cables 48b and 48c. In the retracted position, the lever arm 64 is preferably positioned relative to the canopy cross beam 56b. In the extended position, the lever arm 64 moves forward of the canopy cross beam 56b to allow the boom 22 to move from the closed, non operational position, to an opened operational position. Boom cable 48b is supported relative to a front portion of the boom chassis assembly 24 and extends from the lever arm 64 forward to pulley 90 supported via the front canopy cross beam 56a. The boom cable 48b extends from pulley 90 and is secured to a front of the boom 22, via cross support 86b. The length of the cable 48b is defined so that when the lever arm 64 is in the boom retracted position aligned with canopy cross beam 56b, the cable 48b positions the boom 22 coupled to a free end of boom cable 48b extending beyond pulley 90 in the closed non operational position. When the lever arm 64 shifts to the extended position shown in FIG. 3, the lever arm 64 and thus an secured end of cable 48b move forward to provide slack to the end of the cable 48b coupled to the boom 22 to allow the boom to pivot to the opened operational position.

Boom cable 48c is supported relative to a rear portion of the boom chassis assembly and extends rearwardly from the lever arm 64 to pulley 82 supported via the rear cross beam 56c. The cable 48c extends from pulley 82 to mounting plate 44 of the boom 22. The length of the boom cable 48c is defined so that when the lever arm 64 is in the retracted position, aligned with canopy cross beam 56b, the boom cable 48c positions the boom 22 coupled to a free end of boom cable 48b in the closed, non operational position. When the lever arm 64 shifts to the extended position shown in FIG. 3, the lever arm 64 and thus a secured end of cable 48c move forward to reduce slack to the free end of the cable 48c coupled to the boom 22, beyond pulley 82, to pull the boom 22 to the opened operational position.

Movement of the lever arm 64 is controlled via the boom actuation cylinder 66 which is coupled to an operator control assembly (not shown). Thus, the operator can selectively position the boom between the closed non operational position and the opened operational position via a control coupled to the boom actuation cylinder. The length of the cylinder/rod of the boom actuation cylinder 66 extends to pivot the lever arm 64 forward. Thus, when operation of the boom 22 is completed, the length of the boom actuation cylinder 66 is retracted to pivot the lever arm rearwardly to return the boom 22 to the closed, non-operational position.

Figure 4:
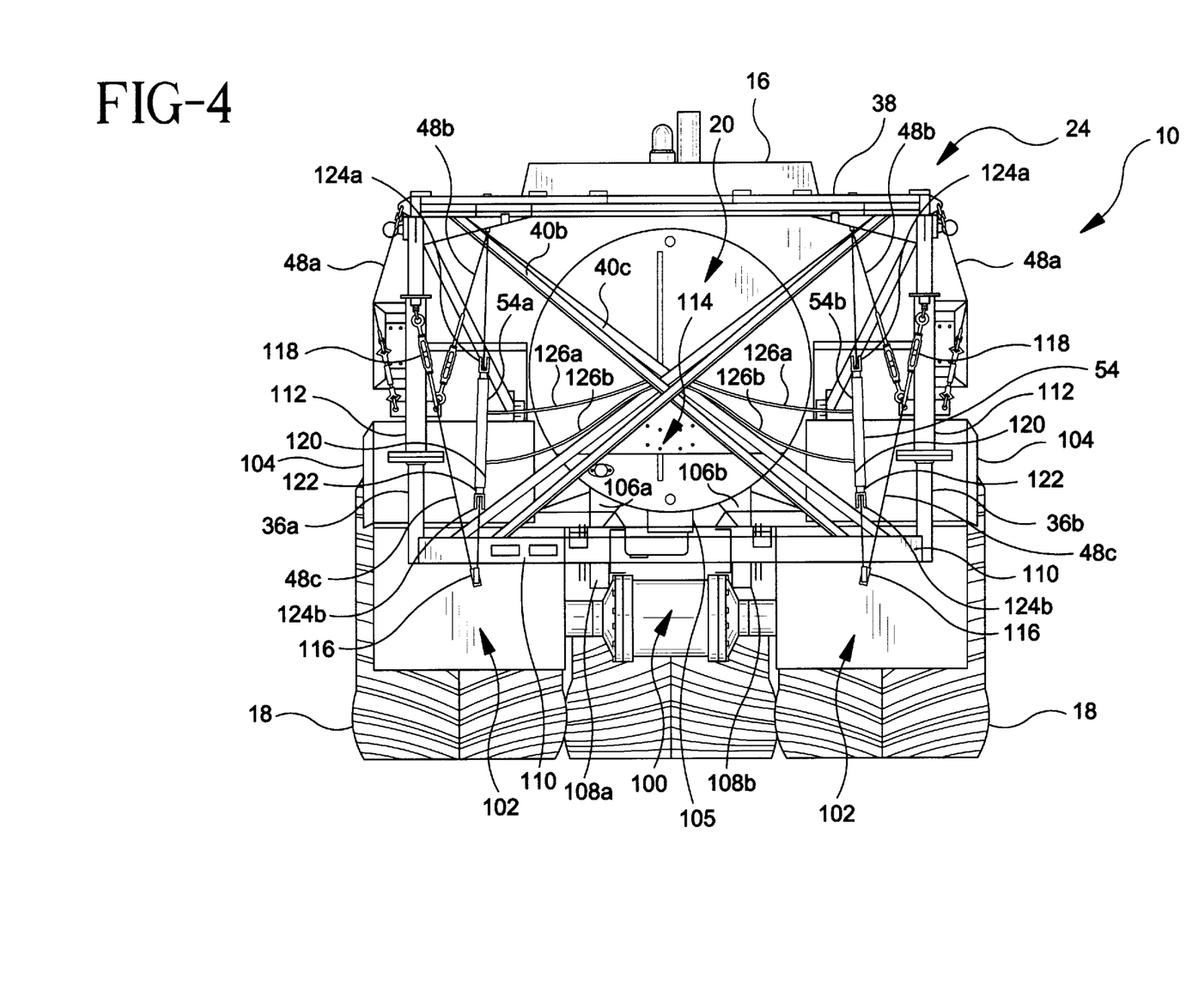
FIG. 4 is a rear elevational view of the vehicle of FIG. 1 illustrating the boom chassis assembly and boom swing control device of the present invention, shown with the booms in the closed, non-operational position.

FIG. 4 is a rear view of the vehicle of FIGS. 1–3. As shown, from the rear view of the vehicle 10, the rear wheel differential 100, rear wheel mud flaps 102 are visible. The tank 20 is supported relative to the frame 14 of the vehicle via saddle 105 and saddle rails 106a–b. The saddle rails 106a–b are supported relative to the frame 14 of the vehicle to support saddle 105 which supports tank 20. The frame 14 of the vehicle 10 includes chassis assembly supports 108a–b. The chassis assembly supports 108a–b support a chassis frame cross beam 110. Opposed support posts 36a and 36b are supported by and extend from opposed ends of the chassis frame cross beam 110 to form the boom chassis assembly 24. The chassis frame cross beam 110 preferably includes nozzles (not visible in FIG. 4) for spraying material from tank 20 behind vehicle 10. As shown, booms 22a–b include a slide tube 112 which are concentically positioned over the support posts 36a and 36b to pivotally support the booms 22a–b between the closed non-operational position and the opened operational position.

Figure 5:
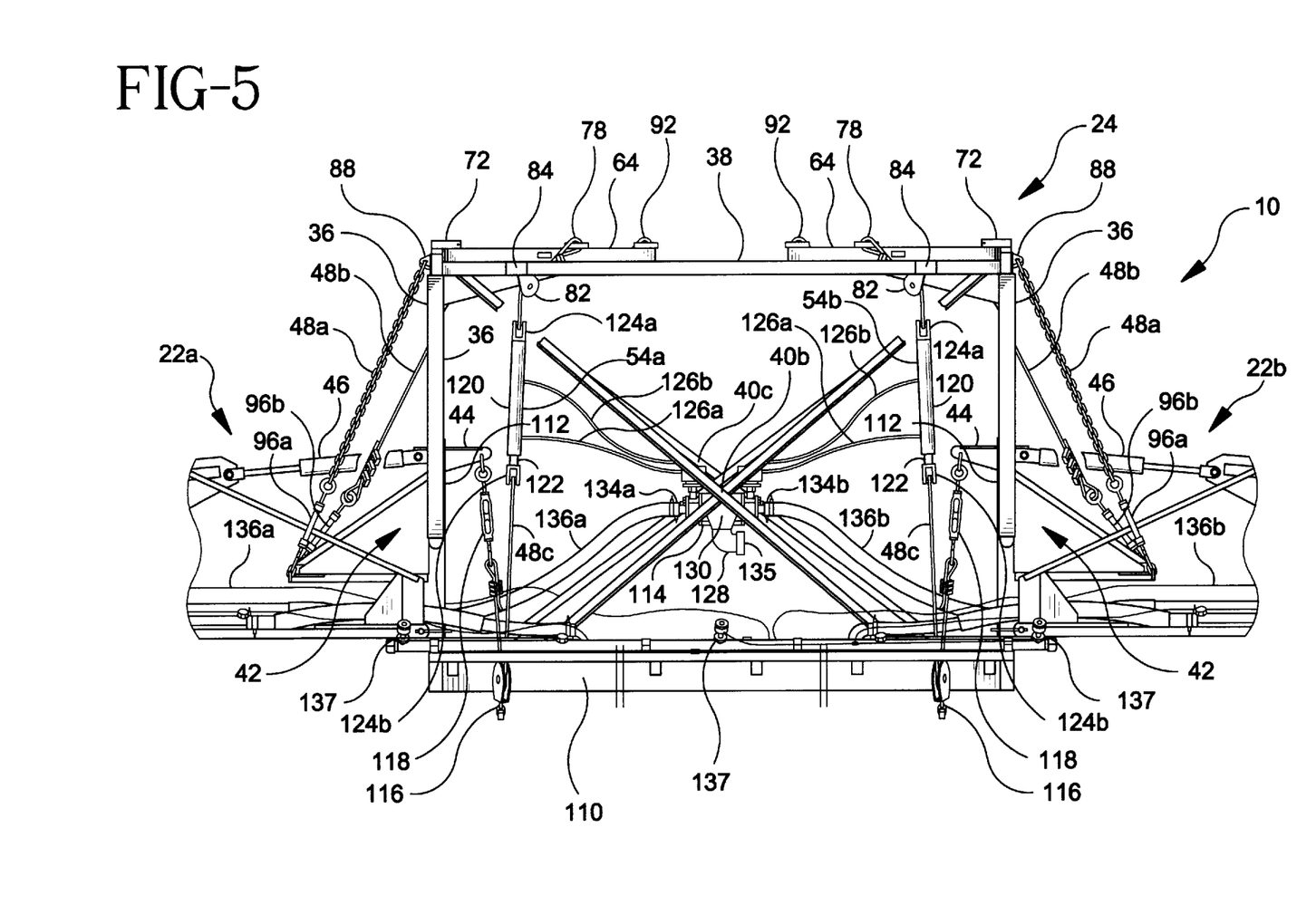
FIG. 5 is a rear elevational view of a partial extent of the booms shown in the opened operational position, boom chassis assembly and a plumbing assembly for supply dispensing material from a dispensing source, not shown.
Figure 6:
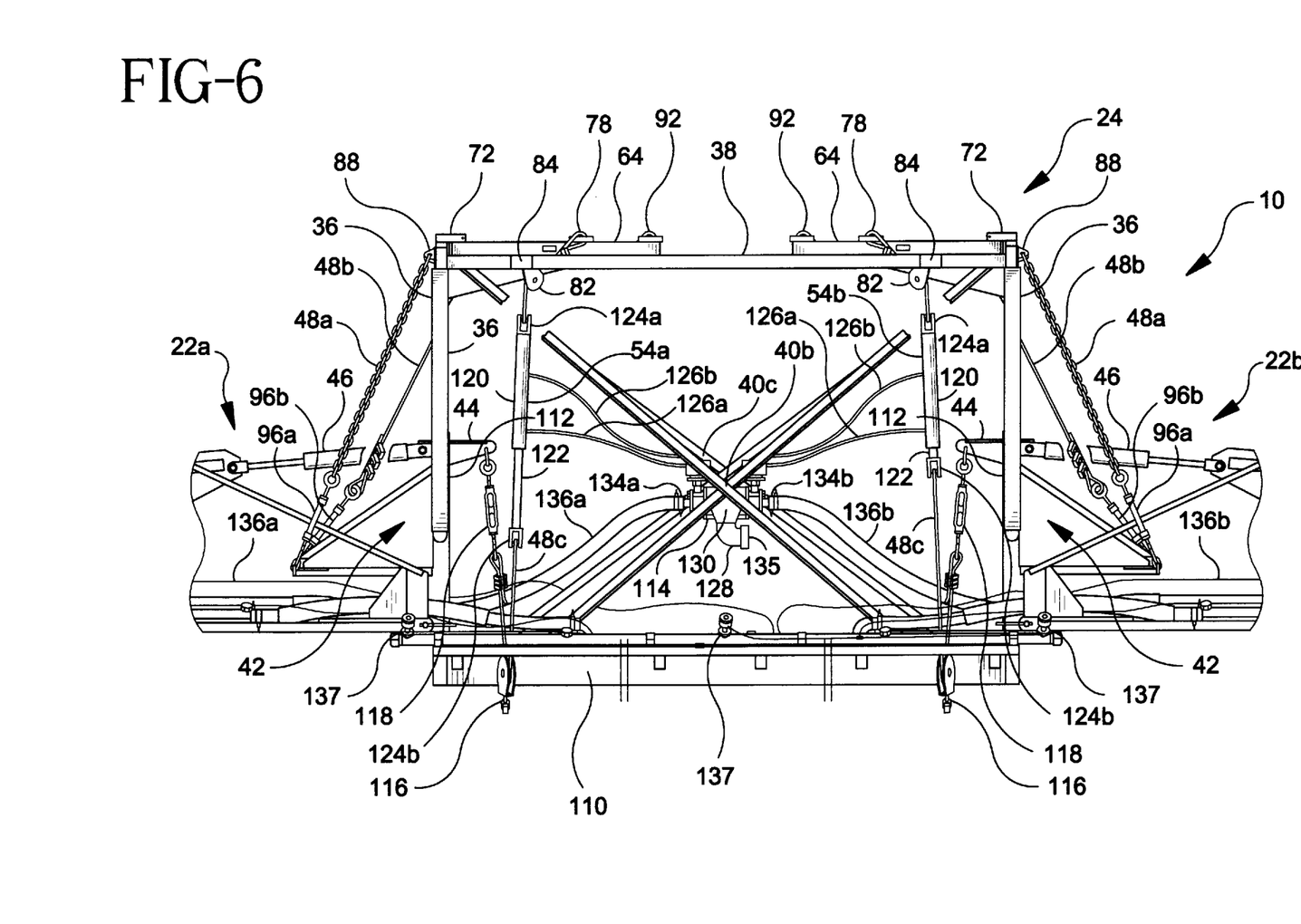
FIG. 6 is a rear elevational view similar to FIG. 5 illustrating a boom swing control device in a break-away position.

The boom chassis assembly 24 also includes an intermediate support truss 40c which is visible from FIGS. 4–6. The intermediate support truss 40c extends from the canopy cross beam 56b of the support canopy 38. Both the rear and intermediate support trusses 40b–c are coupled to and supported by the chassis frame cross beam 110 and both support trusses 40b–c comprise first and second crossed truss beams as shown. A mounting plate 114 is supported via intermediate support truss 40c. The boom cable 48c is moveably supported relative to the chassis frame cross beam 110 via a cable pulley 116 connected to chassis frame cross beam 110. As previously described, the cable 48c is connected to the mounting plate 44 of the boom 22 via a turn buckle 118 to adjust tension of the cable 48c.

Preferably, the boom swing control devices 54a–b of the boom swing control assembly includes a cylinder 120 and a rod 122 assembly. The rod 122 is moveable within the cylinder 120 to extend and retracted the overall length of the boom swing control device 54. The cylinder 120 and rod 122 assembly are secured to the boom cable 48c. An end of cylinder 120 (opposite rod 122) is secured to the boom cable 48c via device 124a and an exposed end of rod 122 is secured to boom cable 48c via device 124b so that the length of the boom cable 48c extends and retracts in combination with the movement of the rod 122 within cylinder 120. Fluid lines 126a–126b are coupled to the boom swing control devices 54a–b for operation of the boom swing control devices 54a–b. It should be noted that control fluid may be hydraulic fluid or the control may be pneumatic or other suitable means.

FIGS. 5–6 are partial rear views of the booms 22 and boom chassis assembly 24, illustrating the booms 22a and 22b in the opened operational position. As previously explained, the boom actuation cylinder 66 facilitates movement of the boom 22 between a closed nonoperational position as illustrated in FIG. 4 to an opened operational position as illustrated in FIGS. 5 & 6. As shown in relation to FIG. 4 and FIG. 5, and as previously described, when the booms 22 are pivoted to the operational position, the slide tube 112 pivots relative to the support post 36 and slides down the support post 36 to a lower operational position closer to the ground. The lever arm 64 rotates counterclockwise to take up cable slack in the boom cable 48c due to the movement of the boom 22 to the operational position.

A plumbing assembly 128 is mounted to the mounting plate 114. The plumbing assembly 128 is operatively coupled to the tank 20 (not shown in FIGS. 5–6) for distributing material from the tank 20 to the boom 22 for distribution over a selected area. The plumbing assembly 128 includes a plumbing manifold 130, defining a plurality of outlet channels 134a–b from the tank 20 and a pump channel 135 operably connected to a pump (not shown). Plumbing lines 136a–b are coupled to the outlet channels 134a–b to deliver material from the tank 20 to the opposed booms 22a and 22b. In particular, as shown in FIG. 5, plumbing line 136a is coupled to outlet channel 134a to deliver material to a first boom 22a and plumbing line 136b is coupled to outlet channel 134b to deliver material to a second boom 22b. The plumbing lines 136a and 136b extend from the outlet channels 134a and 134b along the length of booms 22a and 22b to distribute material along the entire length of the booms 22. Operation of the plumbing assembly 132 is controlled via a control assembly (not shown) which is coupled to the operator control devices in the cab 16 of the vehicle. The nozzles 137 extending along the length of the chassis frame cross beam 110 are visible in FIGS. 5–6.

FIGS. 5–6 comparatively illustrate operation of the boom swing control devices 54a–b of the present invention for controlling and dampening boom swing caused by an external force. FIG. 5 illustrates the boom swing control devices 54a–b in a normal operational condition. FIG. 6 illustrates the boom swing control device 54a in an excited condition for accommodating an external force applied to the boom 22a. It is noted that the external force, as shown in FIG. 6 is applied to boom 22a and not boom 22b where the boom swing control device is shown in the normal operational condition. After an external force is released from boom 22a, the boom swing control device 54 is designed to dampen boom swing caused by the external force to return the boom swing control device 54a to the normal operational condition. In particular, in the normal operational condition, the rod 122 is retracted within the cylinder 120 and in the excited condition, the rod 122 moves relative to the cylinder 120 to an extended position as shown.

Figure 7:
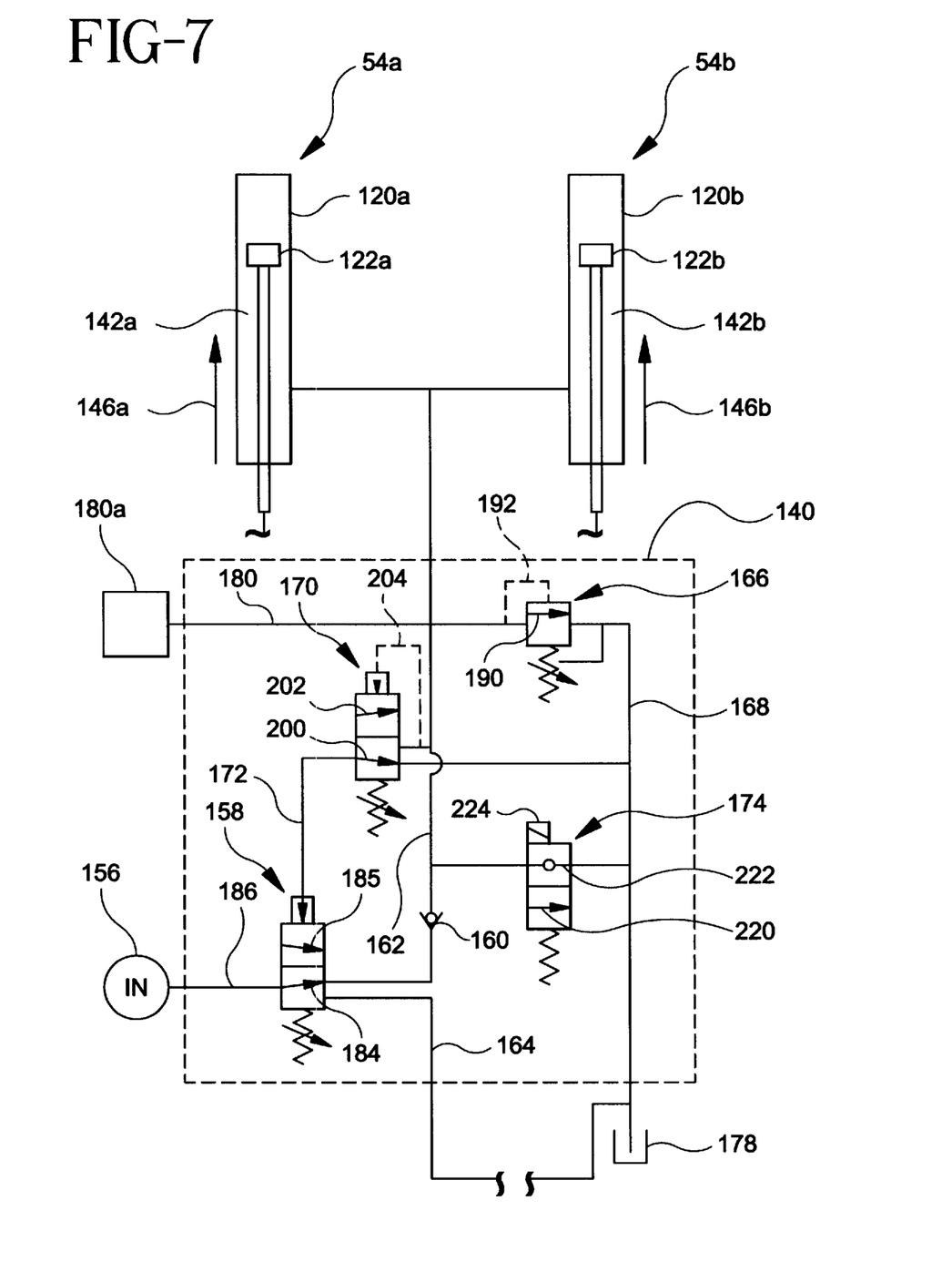
FIGS. 7–10 are schematic views illustrating operation of a control assembly for operating the swing control device of the present invention.
Figure 8:
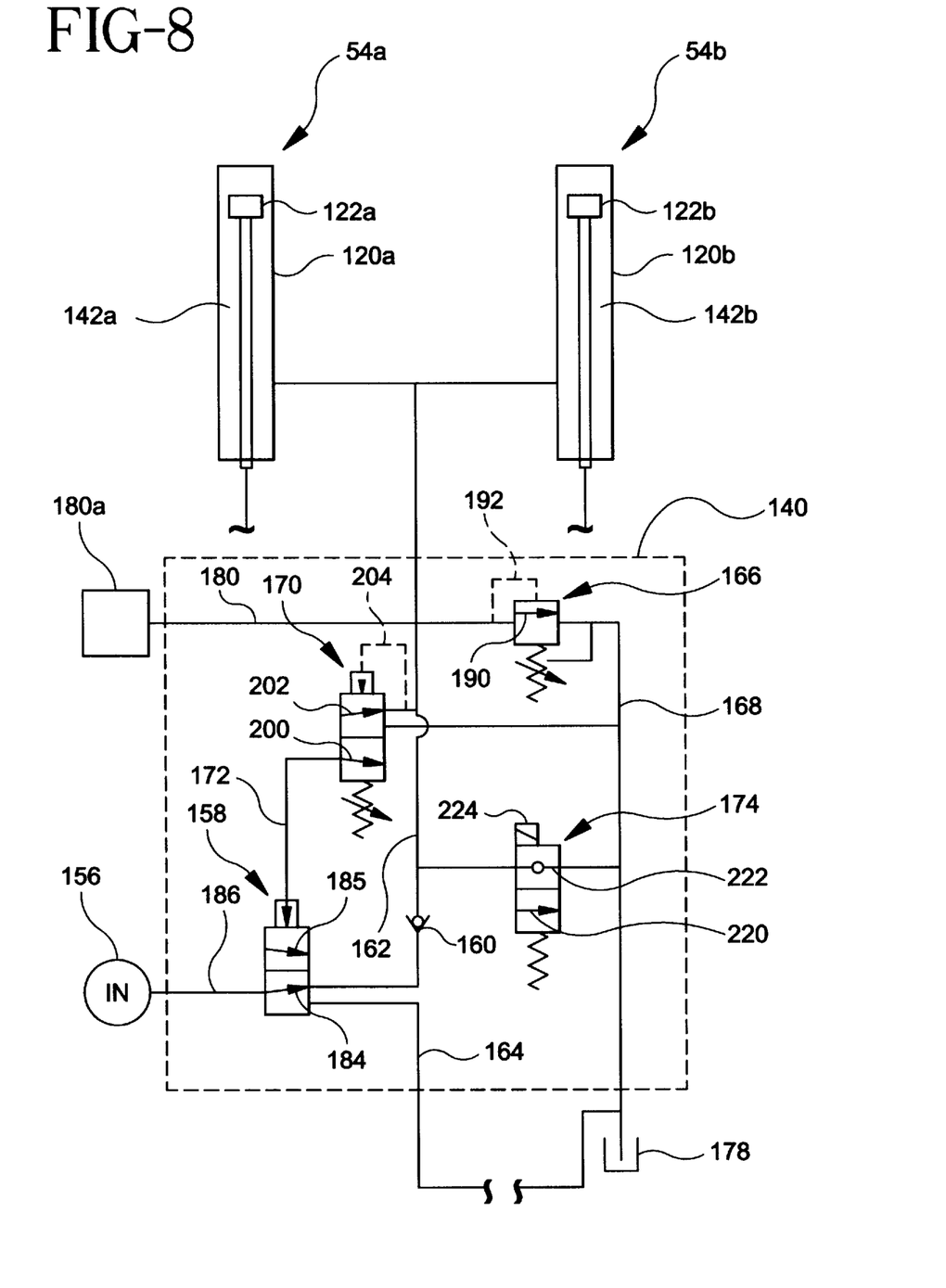

Preferably, operation of the boom swing control devices 54a–b is controlled by a fluid control assembly 140 (not shown in FIGS. 5–6). The fluid lines 126a of each boom swing control assemblies are coupled to the boom swing control devices 54 and the fluid control assembly 140 for dampening external forces that cause movement of the boom relative to the boom chassis assembly 24 as will be described. Fluid lines 126b coupled to the boom swing control devices 54a–b supplies fluid to lubricate the cylinders and to keep the cylinders clean and relatively particle free to allow proper movement of the rod 122 relative to the cylinder 120. FIGS. 7–10 are schematic views illustrating operation of the fluid control assembly 140 for the boom swing control devices 54. The rod 122 of the boom swing control devices 54a–b, is moveably within a hollow interior of the cylinder 120, defining a cylinder chamber 142. As shown, fluid control assembly 140 is coupled to the cylinder chambers 142a–b of the boom swing control devices 54a–b associated with each boom 22a–b. FIG. 7 illustrates operation of the fluid control assembly 140 to supply fluid to the cylinder chambers 142a–b of the boom swing control devices 54a–b to force the rod in a direction indicated by arrow 146a to position the rod 122 in the normal operational condition for the boom swing control devices 54a–b. FIG. 8 illustrates the rod 122 positioned in the cylinder 120 at the normal operation condition.

Figure 9:
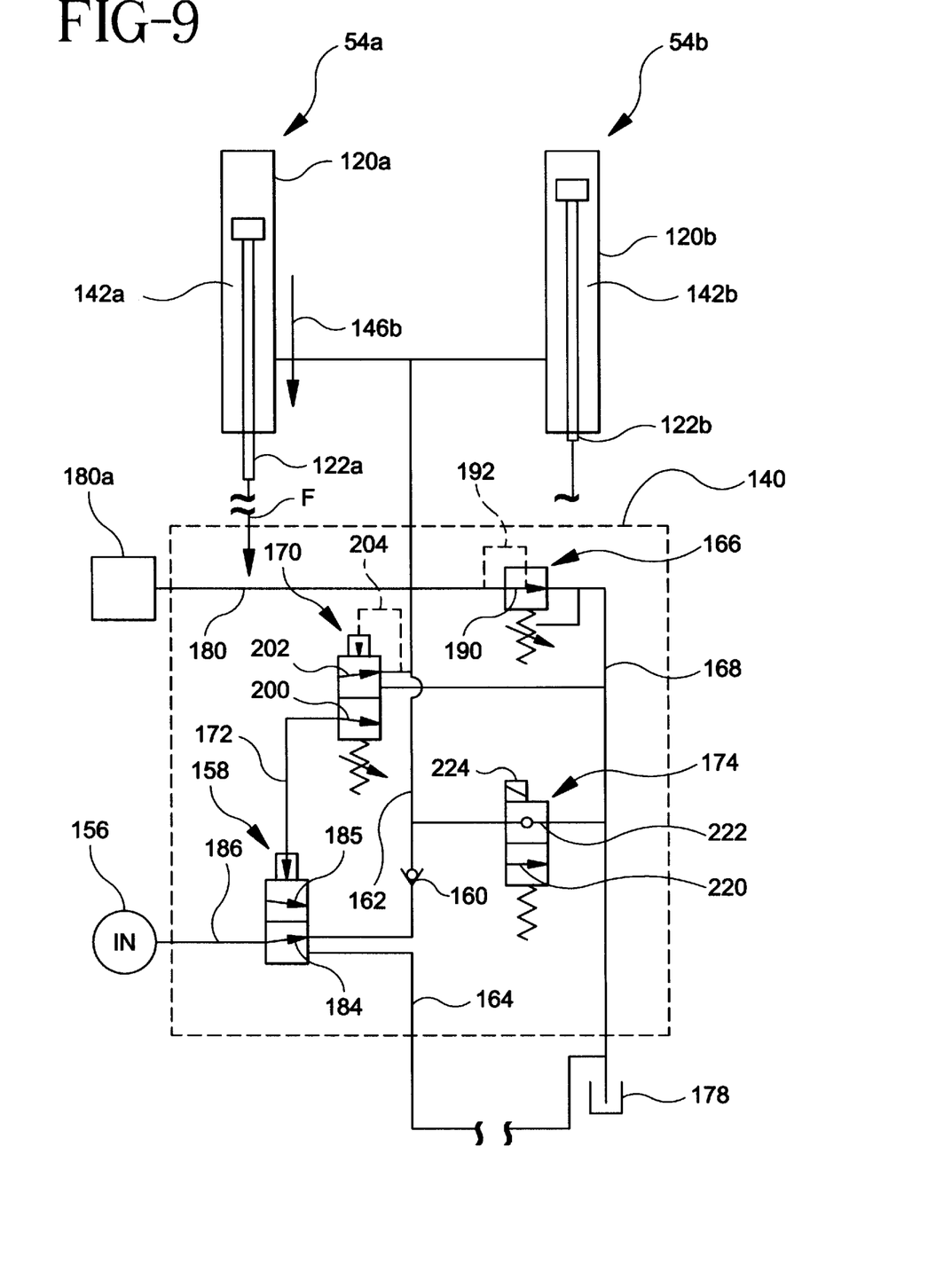

FIG. 9 illustrates operation of the boom swing control device 54a upon application of an external force to boom 22a. When force is applied to the boom 22a, a corresponding force F is applied to the boom cable 48c and rod 122a. This causes the rod 122 to move in direction indicated by arrow 146b. The movement of the rod 122a forces fluid from the cylinder chamber 142a. After, the force F is released, the fluid control assembly supplies fluid to the cylinder chamber 142a to force the rod 122a in the direction indicated by arrow 146a to return the rod 122 to the normal operational condition as shown in FIG. 7. After the force F is released, subsequent extension force may be applied to the rod 122a which is dissipated via operation of the fluid control assembly 140. The system of the present invention is designed to reduce the presence of harmonic based oscillation which was present in previous boom swing control systems.

Figure 10:
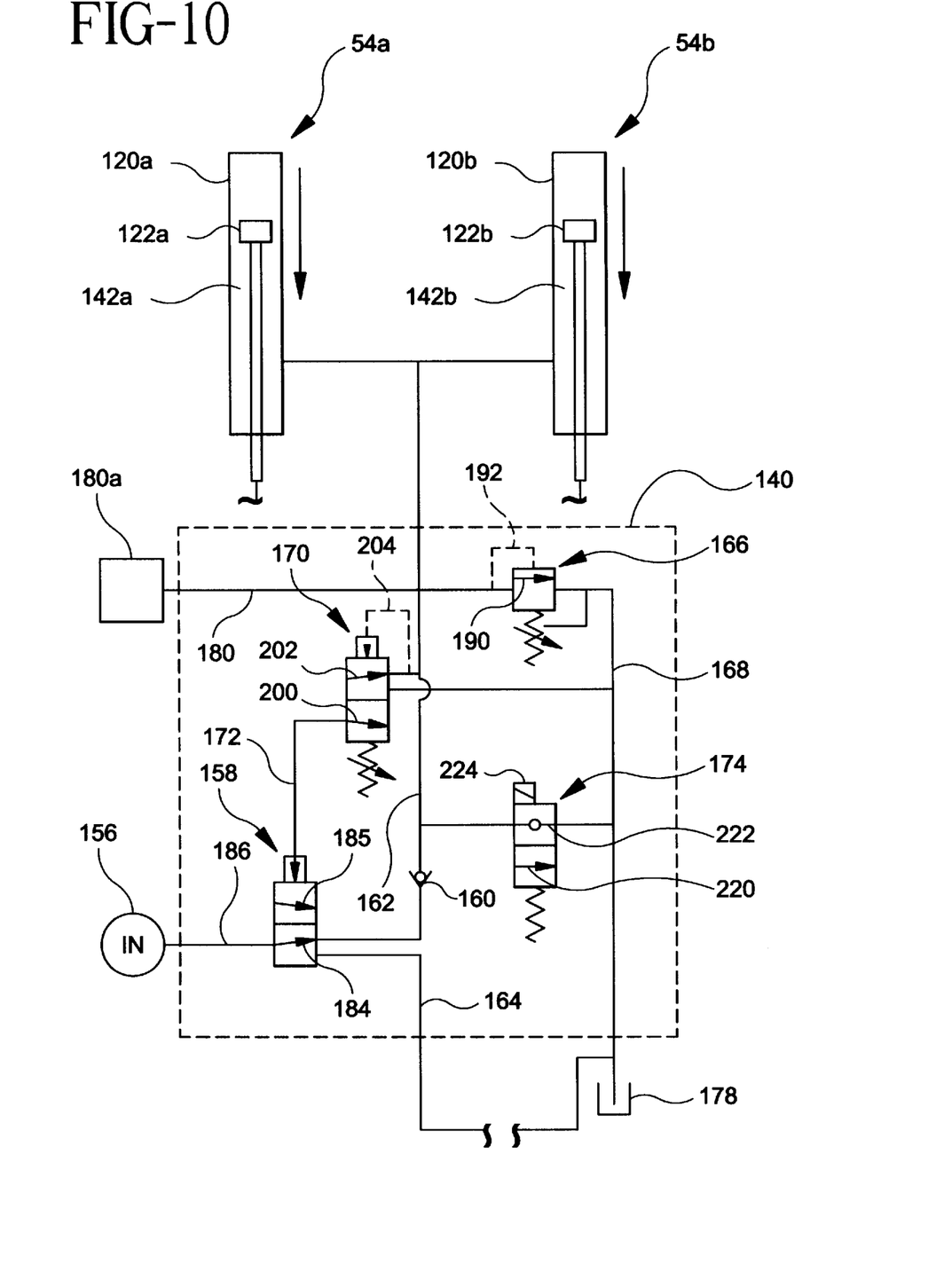

FIG. 10 illustrates a manual dump feature of the fluid control assembly 140 as will be described. It should be understood that although FIGS. 7–10 illustrate operation of a single fluid control assembly 140 for boom swing control devices 54a–b, the invention is not so limited and multiple fluid control assemblies 140 may be used to control each boom swing control device 54a–b.

As shown, the fluid control assembly 140 includes a pump 156, control valve 158, check valve 160, cylinder line 162, application line 164, relief valve 166, tank or release line 168, pilot valve 170, pilot line 172, manual dump valve 174, tank 178 and test line 180. The cylinder line 162 operably connects cylinder chambers 142a–b to a fluid source. Fluid flows through the cylinder line 162 to supply to or release fluid from the cylinder chambers 142a–b. The supply of fluid through cylinder line 162 into the cylinder chambers 142a–b is controlled by control valve 158. Preferably, the control valve 158 is a pilot operated control valve having an inlet channel 184 and an application channel 185.

The spool of the control valve 158 is operated to selectively align an inlet line 186 from the pump 156 with the inlet channel 184 and the application channel 185 of the control valve. When the spool of the control valve 158 is positioned so that the inlet channel 184 aligns with the inlet line 186, the inlet channel 184 also aligns with the cylinder line 162 operably coupled to the cylinder chambers 142a–b as shown in FIG. 7 to define a cylinder fill position of the control valve 158. When the spool of the control valve 158 is positioned so that the application channel 185 aligns with the inlet line 186, a dump position of the system is defined as shown in FIG. 8. In the dump position, application channel 185 also aligns with application line 164 which supplies fluid to other operation components of the booms 22a–b, such as the boom position adjustment cylinder 46 and the boom actuation cylinder 66 (not shown) and is coupled to tank 178 as shown in FIG. 8.

Thus, when the spool is in a cylinder fill position as shown in FIG. 7, the inlet channel 184 is coupled with the inlet line 186 and the cylinder line 162 to supply fluid to cylinder chambers 142a–b. As shown, the cylinder line 162 includes check valve 160 which provides a system for sealing the circuit of the fluid control assembly so that fluid remains in the cylinder chambers 142a–b during normal operating conditions to limit fluid flow from a filled cylinder chamber 142 so that fluid does not leak from the cylinder chambers 142a–b unless an external force F is applied to the booms 22a–b. When the cylinder chambers 142a–b are filled, then the spool is shifted to the dump position shown in FIG. 8, to align the application channel 185 with the inlet line 186 and the application line 164 so that fluid is pumped from pump 156 to other operational components then to the tank 178.

The relief valve 166 allows fluid to escape from the cylinder chambers 142a–b upon application of an external force F to the booms 22a–b to allow the rods 122a–b to be slideably extended within cylinders 120a–b in the direction of arrow 146b to accommodate for the external force as shown in FIG. 9. The relief valve 166 is a pressure actuated valve having a relief channel 190 and pilot actuation line 192. As shown, the relief valve 166 selectively connects the cylinder line 162 (fluidly coupled to cylinder chambers 142a–b) with the tank or release line 168 which is preferably coupled to the tank 178, but could be released to another system for alternate use. The relief valve 166 selectively fluidly connects the cylinder line 162 with the tank line 168 by aligning the relief channel 190 with the cylinder line 162 and the tank line 168. The relief valve 166 is normally biased so that the relief channel 190 is out of alignment with the cylinder line 162 and the tank line 168 in a closed position. When force F is applied to the booms, fluid is forced from a cylinder chamber 142. The relief valve 166 is actuated so that the relief channel 190 aligns the cylinder line 162 and tank line 168 to allow fluid to escape a cylinder chamber 142a and empty into tank 178 in a relief position.

The relief valve 166 is actuated against the bias via the pilot actuation line 192 when force F is applied to the boom 22a as shown in FIG. 9. Upon application of force F to boom 22a, fluid is forced from cylinder chamber 142a. Check valve 160 and pilot valve 170 limit the path of the escaping fluid to the pilot actuation line 192 to develop a relief pressure in the actuation line 192. The pilot actuation line 192 is operably coupled to the relief valve 166 so that when fluid collects in the pilot actuation line 192, the fluid forces the spool of the relief valve 166 against the bias to align the relief channel 190 relative to the cylinder line 162 and the tank line 168 to allow the fluid forced from cylinder chamber 142a to empty into tank 178 as shown in FIG. 9. Preferably, the pressure for actuating the relief valve 166 is approximately 2,200 psi. As described, fluid is successively forced from the cylinder chamber 142a through the relief valve 166 due to the effect of force (or swing) and fluid is sequentially re-supplied to the cylinder chamber 142a to dampen the force. Fluid may be continuously forced from the cylinder chamber 142a as long as sufficient forces are present to create sufficient pressure to actuate the relief valve 166.

The pilot valve 170 actuates the spool of the control valve 158 between the cylinder fill position and the dump position to selectively align the inlet channel 184 and application channel 185 relative to the inlet line 186. The pilot valve includes drain channel 200, pilot channel 202 and actuation line 204. The pilot valve 170 operates between a drain position shown in FIG. 7 and an actuation position shown in FIG. 8. The pilot valve 170 is normally biased in the drain position. In the drain position, shown in FIG. 7, the spool of the pilot valve 170 aligns the drain channel 200 with the pilot line 172 and tank line 168 so that fluid in the pilot line 172 is drained to tank 178. In the actuation position, shown in FIG. 8, the pilot channel 202 is aligned with the cylinder line 162 and pilot line 172 so that fluid flows into pilot line 172 to actuate the control valve 158.

The pilot valve 170 is actuated from the normal drain position to the actuation position via the actuation line 204. The control valve 158 is normally biased so that the inlet channel 184 aligns with the inlet line 186 and cylinder line 162 to fill cylinder chambers 142a–b. When the cylinder chambers 142a–b are filled, release of fluid from the circuit is limited by the check valve 160 and relief valve 166. Thus, fluid collects in the actuation line 204 of the pilot valve 170 to actuate the spool, normally biased to open pilot line 172 to tank line 168, to align the pilot channel 202 with the cylinder line 162 and pilot line 172. Thus, after the cylinder chambers 142a–b are filled, fluid being pumped into the cylinder line 162 is then diverted to the pilot line 172 via fluid pressure built in the cylinder chambers 142a–b. Preferably, the pilot valve 170 is actuated to the actuation position at a pressure of approximately 1,800 psi. The pilot line 172 is operably coupled to the control valve 158 to unseat the spool of the control valve from the normally biased fill position, to align the application channel 185 relative to the inlet line 186 and application line 164 so that fluid is diverted to application line 164 when the cylinder chamber 142 is filled.

The dump valve 174 is a manually operated valve. The dump valve 174 allows fluid to be manually released from the circuit to drain the system. The dump valve 174 includes a dump channel 220, a closed channel 222 and a manual actuator 224. The dump valve 174 is manually operated between a closed position shown in FIGS. 7–9 and a dump position shown in FIG. 10. In the closed position, the closed channel 222 is aligned relative to cylinder line 162 so that fluid is retained in the cylinder line 162. The closed channel 222 includes a check valve to restrict the flow of fluid through closed channel 222 so that fluid is retained in the cylinder line 162. In the dump position, the dump channel 220 of the valve 174 aligns with the cylinder line 162 and the tank line 168 so that fluid may be drained from the cylinder line 162 to the tank line 168 and to tank 178. The dump valve 174 is selectively actuated between the closed position and the dump position via manual actuator 224.

Test line 180 is coupled to test port 180a for testing operating pressures and fluid status for the system. Thus, the overall operation of the fluid control assembly 140 for the boom swing control assemblies is described as follows. As shown in FIG. 7, empty cylinder chambers 142a–b are filled via fluid supplied by pump 156 through the inlet channel 184 of the control valve 158 and cylinder line 162. After the cylinder chambers 142a–b are filled, fluid pumped into the cylinder line 162 is funneled to the actuation line 204 of the pilot valve 170. Pressure builds in the actuation line 204 to shift the spool of the pilot valve 170 against the bias to align pilot channel 202 relative to the pilot line 172 to supply fluid pressure to actuate the control valve 158 against its normally biased position to align the application channel 185 relative to inlet line 186 and application line 164 so that excess fluid is released to other operational components and to tank 178 after the cylinder chambers 142a–b are filled. Preferably, pump 156 is a continuously operating pump 156 so the alignment of the application channel 185 allows the continuously pumped fluid to be released to the other operational components and then to the tank 178.

When a force is applied to either boom 22a or 22b, fluid is forced from cylinder chambers 142a or 142b to accommodate for the force applied. Fluid forced from either cylinder chamber 142 accumulates in pilot actuation line 192 of the relief valve 166 since all other channels of escape are closed or filled (i.e. pilot line 172 is filled to force control valve 158 against the bias, and manual dump valve 174 is closed). When sufficient pressure has built in the pilot actuation line 192, the spool of the relief valve 166 shifts to align the relief channel 190 with the cylinder line 162 and tank line 168 to dump the relieved fluid to tank 178 as shown in FIG. 9. Fluid from the pilot line 172 is thus also drained via the relief channel 190 and tank line 168. Since the pressure in the system is low since fluid is being drained via the relief valve 166 and fluid is drained from the actuation line 204 of the pilot valve 170, the pilot valve shifts to its normally biased dump position.

After the system is drained, the spool of the relief valve 166 is forced to its normally biased closed position where the relief channel 190 is out of alignment with the cylinder line 162 and the tank line 168. Since the fluid is drained from the pilot line 172, the control valve 158 returns to its normally biased fill position, where the inlet channel 184 is aligned with the inlet line 186 and the cylinder line 162 to refill the cylinder chamber 142a or 142b when the force is released. The fluid supplied to refill the cylinder chamber 142a or 142b is sufficient to return the rod to the normal operation position without significant oscillation which would contribute to excess swing. The pilot valve 170 is forced to its normally biased drain position, to align the drain channel 200 relative to the tank line 168 so that the pilot line 172 is drained for a new cycle as shown in FIG. 7.

The system of the present invention does not introduce significant oscillation since rod is extended to the excited position by releasing fluid from the cylinder chamber without introducing significant potential energy to the system to provide a force to return the rod to the normal operation position. An independent return force is supplied by the control assembly to return the rod to the normal operation position which is developed independently of the stroke of the rod between the normal operation position and the excited position, to thus, reduce oscillation of the system. The return force applied is a constant force which does not vary based upon the length of the stroke between the normal operational position and the excited position. It should be noted that as the force applied to the booms 22a or 22b is dampened, successive amount of fluid may be forced from and filled back into the cylinder chambers 142a–b so that the magnitude of the swing force is dampened via operation of the boom swing control devices 54a–b.

While the invention has been described above in connection with a preferred embodiment of the invention, it should be understood that the invention is not limited to the preferred embodiment described. Changes and modifications may be made to the preferred embodiment described which do not depart from the spirit and scope of the invention. For example, although, the boom swing control device of the present invention has been described with reference to a fluid control system, other control systems may be used for allowing movement of the rod 122 relative to the cylinder 120 upon application of a predetermined force and biasing the rod 122 in a normal operating position relative to the cylinder 120 for boom swing control which are within the scope of this invention as set forth in the claims.

What is claimed:

1. A boom assembly comprising:

a boom frame;

a boom operably coupled to the boom frame;

a boom swing control assembly comprising:

at least one cable including opposed ends, one of said opposed ends being operably coupled to the frame and the other of said opposed ends being operably coupled to the boom;

a boom swing control device comprising;
   a first member, an end of said first member being coupled to the cable;
   a second member, said second member being moveably supported relative to the first member between an operation position and an excited position to define the stroke of the second member, the second member being coupled to the cable; and
   control assembly operably coupled to the second member for controlling the position of the second member relative to the first member, said control assembly including a means for allowing the second member to move relative to the first member from a normal operation position to an excited position upon application of a predetermined force and including a system for supplying a return force to the second member to position the second member in the normal operation position relative to the first member.

2. The boom assembly of claim 1 wherein the means for allowing the second member to move relative to the first member from a normal operation position to an excited position upon application of a predetermined force is independent of the system for supplying a return force to the second member such that the means for allowing the second member to move relative to the first member upon application of a predetermined force does not provide energy for supplying a return force to the second member.

3. The boom assembly of claim 1 wherein the return force supplied is a constant return force along the extent of the stoke of the second member between the operation position and the excited position.

4. The boom assembly of claim 2 wherein the first member comprises a cylinder having a cylinder chamber and said second member is a rod moveable within the cylinder chamber, said cylinder and rod assembly and the system for supplying a return force to the second member comprises:
   means for selectively supplying fluid to the cylinder chamber to bias the rod in the normal operation position within the cylinder; and
   the means for allowing the second member to move relative to the first member includes a means for releasing fluid from the cylinder chamber in response to a selected release pressure for allowing the rod to move relative to the cylinder to an excited position upon the application of force.

5. The boom assembly of claim 4 wherein means for selectively supplying fluid to the cylinder chamber comprises:
   a fluid source;
   a pump for supplying fluid from the fluid source;
   a cylinder line operably coupled to the cylinder chamber; and
   means for selectively supplying fluid from the pump through the cylinder line to the cylinder chamber to bias the rod in the normal operating position during normal operation of the boom.

6. The boom assembly of claim 5 wherein the pump is a normally operating pump and the means for selectively supplying fluid through the cylinder line to the cylinder chamber comprises:
   a fluid inlet line operably coupled to the pump and selectively coupled to the cylinder line for supplying fluid;
   an alternate line for releasing fluid from the control assembly;
   a control valve operably coupled to the fluid inlet line, alternate line and cylinder line and having first and second channels, the control valve operating between first and second positions, in the first position, the first channel of the control valve aligning the cylinder line with the inlet line to supply fluid to the cylinder chamber and in the second position, the second channel of the control valve aligning the inlet line relative to the alternate line for releasing fluid from the control assembly; and
   means for selectively operating the control valve between the first and second positions to selectively supply fluid to bias the rod in the normal operating position relative to the cylinder during operation.

7. The boom assembly of claim 6 wherein the means for selectively operating the control valve between the first and second positions comprises a pilot actuation assembly operably coupled to the control valve.

8. The boom assembly of claim 6 wherein the control valve is normally biased to align the first channel relative to the inlet line and the cylinder line for supplying fluid to the cylinder chamber and the pilot actuation assembly is designed to shift the control valve to the second position after sufficient fluid is supplied to the cylinder chamber to position the rod in the normal operation position to align the inlet line with the second channel and the alternate line.

9. The boom assembly of claim 7 wherein the pilot actuation assembly includes;
   a pilot line operably coupled to the control valve;
   a pilot valve operable coupled to pilot line for selectively supplying fluid to the pilot line to actuate the control valve between the first and second positions, said pilot control valve including a pilot channel and being operable between an actuating position and non-actuating position, in the actuating position the pilot channel being aligned relative to the cylinder line and the pilot line to supply fluid from the cylinder line to the pilot line to actuate the control valve and in the non-actuating position, the pilot channel being out of alignment with either the pilot line or the cylinder line; and
   means for actuating the pilot valve between the actuating position and the non actuating position, said means being designed to actuate the pilot valve to the actuating position after the cylinder chamber is supplied with sufficient fluid to position the rod in the normal operating position relative to the cylinder.

10. The boom assembly of claim 9 where the means for actuating the pilot valve between the actuating position and the non actuating position includes an actuation line operably coupled to the pilot valve and the cylinder line, such that after sufficient fluid is supplied to the cylinder chamber for operation, fluid is directed from the cylinder line to the actuation line to actuate the pilot valve at a predetermined pressure to thereby actuate the control valve to the second position to release fluid from the control assembly.

11. The boom assembly of claim 10 wherein the pilot valve is actuated between the actuating position and the non actuating position upon application of a pressure of at least 1,800 psi.

12. The boom assembly of claim 9 wherein the pilot valve includes a drain channel, the drain channel being operably coupled with the pilot line and a release line in the non-actuating position to drain the pilot actuation assembly for successive cycles.

13. The boom assembly of claim 4 wherein the means for releasing fluid from the cylinder chamber in response to a selected release pressure comprises a relief valve operably between a closed position and a relief position, in the closed position the relief valve restricting the flow of fluid from the cylinder chamber and in the relief position, the relief valve allowing fluid to be released from the cylinder chamber.

14. The boom assembly of claim 13 wherein the means for operating the relief valve between the closed position and the relief position comprises:

an actuation line operably coupled to the cylinder chamber and relief valve so that when fluid is released from the cylinder chamber upon application of a release force, fluid accumulates in the actuation line to actuate the relief valve to the relief position so that fluid is released in response to a predetermined force.

15. The boom assembly of claim 13 wherein the relief valve is actuated from the closed position to the relief position upon application of a release pressure of at least 2,200 psi.

16. The boom assembly of claim 1 wherein the boom is pivotally connected relative to the frame so that the boom is moveable between an opened operational position and a closed non-operational position and including means for alternating the boom between the opened operational position and the closed non-operational position.

17. The boom assembly of claim 16 wherein the means for alternating the boom between the opened operational position and the closed non-operational position comprises:

a lever arm operable coupled to the boom and moveable between a boom extended position and a boom retracted position to move the boom between the opened operational position and closed non-operational position; and a lever arm actuation assembly operably coupled to the lever arm for moving the lever arm between the boom extended position and the boom retracted position.

18. The boom assembly of claim 1 wherein a plurality of cables operably support the boom relative to the frame.

* * * * *